United States Patent Office 2,822,398
Patented Feb. 4, 1958

2,822,398

PROCESS FOR PREPARING CYCLOHEXANONE

Robert E. McClure, Niagara Falls, N. Y., assignor to Olin Mathieson Chemical Corporation, a corporation of Virginia No Drawing. Application September 24, 1954
Serial No. 458,267

6 Claims. (Cl. 260—586)

My invention relates to a new process for the conversion of nitrocyclohexane to cyclohexanone.

Nitrocyclohexane has been reduced in various ways to cyclohexanone oxime. Catalytic hydrogenation usually results in some yields of the desired product but the process is not sufficiently quantitative for commercial use. The hydrogen sulfide reduction of the sodium salt of nitrocyclohexane has also been used but the oxime is accompanied by numerous by-products and extensive purification is required. Cyclohexanone oxime is also obtained from nitrocyclohexane by reduction with ammonia as described, for example, by Grundmann in U. S. Patent 2,638,482.

In attempting to reduce nitrocyclohexane to cyclohexanone oxime with carbon monoxide in the presence of hydrogenation catalysts, I have surprisingly found that the nitrocyclohexane is converted largely to cyclohexanone. Depending upon precisely how the reaction is carried out, cyclohexanone oxime is at times formed to some extent as a by-product of the reaction. This is advantageous when the ketone is subsequently to be converted to oxime since the reaction mixture can be treated with hydroxylamine and the mixture converted entirely to oxime. Alternatively, the mixture of oxime and ketone can be separated, for example, by aqueous acid extraction to remove the oxime as a water-soluble salt from the ketone. In this way each can be recovered separately.

My process can be carried out using a wide variety of reaction conditions. In general, however, the reaction temperature is maintained within the range from about 150 to 250° C. and the reaction pressure within the range from about 1000 to 2000 pounds per square inch. Suitable conversions of the nitrocyclohexane to cyclohexanone are obtained in about three hours, but longer reaction periods of six hours or more can be used and do not appear to be deleterious, particularly if the reaction temperature is in the lower portion of the temperature range just recited.

The reaction is advantageously performed with the nitrocyclohexane in admixture with an inert solvent. Benzene and methanol are suitable solvents, but in their place there can be used other normally liquid hydrocarbons or alcohols which are inert under the reaction conditions, or mixtures thereof. Thus, in place of benzene and methanol, there can be used toluene, the xylenes, ethanol, isopropanol and the like. Cyclohexane, methyl cyclohexane, cyclopentane, methyl cyclopentane and the like are also useful solvents, particularly in the lower portion of the recited temperature range where dehydrogenation is not likely to occur.

A wide variety of hydrogenation catalysts is useful in carrying out the process of my invention. These catalysts include, for example, Raney nickel, Raney cobalt, platinum or palladium supported on carbon, copper chromite, silicated zinc oxide, the silver-zinc-calcium hydrogenation catalyst of Grundmann prepared and activated as described in Z. angew. Chem., 62, 558–60 (1950), and the like.

The following examples illustrate in detail the practice of my invention and are to be considered not limitative.

The catalyst used in Examples I and VI was prepared substantially as described by Grundmann (Z. angew. Chem., 62, 558–60 (1950)). Thirty-four grams of silver nitrate ($AgNO_3$), 47 grams of calcium nitrate $(Ca(NO_3)_2.4H_2O)$ and 470 grams of zinc nitrate ($Zn(NO_3)_2.6H_2O$) were dissolved in 2000 milliliters of water. The solution was filtered and heated. A solution of 252 grams of ammonium bichromate and 300 milliliters of concentrated aqueous ammonia in 1500 milliliters of water was added in a thin stream from a separatory funnel to the first solution, stirred in a 4-liter beaker. The precipitate was filtered and washed with three portions of distilled water. It was dried in a muffle furnace at 375° C. over a week-end. The product was ground with 1000 milliliters of 2 N acetic acid and filtered. This step was repeated three additional times. The resulting solid was washed with distilled water until the filtrate was colorless and then dried in an oven over night at 100° C. The dried product was pulverized and bottled. Yield, 189.7 grams.

*Example I*

A micro bomb was charged with 25.8 grams (0.2 mole) of nitrocyclohexane, 100 milliliters of benzene and 16.5 grams of the silver-zinc-calcium catalyst prepared as described by Grundmann (Z. angew. Chem., 62, 558–60 [1950]). Carbon monoxide was added to a pressure of 1000 p. s. i. and the mixture was rocked for six hours at a temperature of 175° C. Maximum pressure developed was 1400 p. s. i. The bomb was cooled, carbon monoxide was bled off and the catalyst was removed by filtration. Analysis of the benzene solution by infrared showed the presence of 0.18 mole of nitrocyclohexane, and 0.02 mole of cyclohexanone. The conversion was thus 10% and the yield based on the nitrocyclohexane consumed was 100%. No oxime was present. The cyclohexanone can be recovered by caustic extraction of the nitrocyclohexane using 10% by weight aqueous caustic and distillation of the benzene solution at atmospheric pressure.

*Example II*

A micro bomb was charged with 25.8 grams (0.2 mole) of nitrocyclohexane, 100 milliliters of benzene and 20 grams of a silicated zinc oxide catalyst prepared as follows: A stiff paste made by stirring 500 grams of pure zinc oxide with 250 grams of a 20% by weight aqueous solution of sodium silicate ($Na_2O:SiO_2$ ratio about 1:3.25) was dried overnight in a vacuum oven at 60° C. The solid was baked at 250° C. for three hours and then ground in a ball mill to 100–200 mesh.

The bomb was filled with carbon monoxide to a pressure of 1000 p. s. i. and shaken for three hours at 175° C. The maximum pressure developed was 1450 p. s. i. The bomb was cooled, carbon monoxide bled off and the catalyst was removed by filtration. Analysis of the benzene solution indicated the presence of 0.19 mole of nitrocyclohexane and 0.01 mole of cyclohexanone indicating a conversion of 5% but a yield of 100% of clyclohexanone based on the nitrocyclohexane converted. No cyclohexanone oxime was present. The cyclohexanone can be recovered by fractionation of the solution at atmospheric pressure.

*Example III*

A micro bomb was charged with 25.8 grams (0.2 mole) of nitrocyclohexane, 100 milliliters of benzene and 10 grams of Raney nickel catalyst together with 0.5 gram of sodium cyanide as catalyst activator. Carbon monoxide was introduced to a pressure of 1000 p. s. i. The bomb was closed and rocked at a temperature of 150° C. for three hours. The bomb was cooled, carbon monoxide was bled off and the catalyst was removed by filtration. Analysis of the benzene solution showed the presence of 0.16 mole of nitrocyclohexane and 0.03 mole of cyclohexanone. The conversion was 20% and the yield of cyclohexanone based on converted nitrocyclohexane was 75%. Cyclohexanone oxime was absent. The cyclohexanone can be recovered by fractionation of the solution at atmospheric pressure.

*Example IV*

A micro bomb was charged was 25.8 grams (0.2 mole) of nitrocyclohexane, 100 milliliters of benzene and 4 grams of Raney cobalt. Carbon monoxide was introduced to a pressure of 500 p. s. i. The bomb was closed and shaken for three hours at 250° C. The maximum pressure reached was 1130 p. s. i. The bomb was cooled, carbon monoxide was bled off and the catalyst was removed by filtration. Analysis of the resulting benzene solution indicated the presence of 0.17 mole of nitrocyclohexane, 0.0054 mole of cyclohexanone oxime and 0.025 mole of cyclohexanone. The conversion was thus 15%, the yield of cyclohexanone was 83% and the yield of oxime was 18%. The oxime can be removed by extraction with 10% by weight sulfuric acid to form a water-soluble oxime salt and the residual benzene solution can be fractionated at atmospheric pressure to recover nitrocyclohexane and the cyclohexanone product.

*Example V*

A micro bomb was charged with 25.8 grams (0.2 mole) of nitrocyclohexane, 100 milliliters of benzene and 2.6 grams of a catalyst prepared by reducing palladium chloride on carbon with hydrogen to obtain a supported catalyst containing 10% of palladium metal. Carbon monoxide was introduced to a pressure of 500 p. s. i. The bomb was closed and shaken at a temperature of 250° C. for three hours. A maximum pressure of 1210 p. s. i. was developed. The bomb was cooled, carbon monoxide bled off and the benzene solution was filtered to remove catalyst. Analysis of the resulting filtrate showed the pressure of 0.15 mole of nitrocyclohexane, 0.003 mole of cyclohexanone oxime and 0.036 mole of cyclohexanone. The conversion was thus 25% and the yield of cyclohexanone was 72%. A yield of 6% of cyclohexanone oxime was also obtained. On removing the benzene by distillation at atmospheric pressure, the product was suitable for treatment with hydroxylamine to produce cyclohexanone oxime.

*Example VI*

A micro bomb was charged with 54 grams (0.42 mole) of nitrocyclohexane, 100 milliliters of methanol and 20 grams of the silver-zinc-calcium catalyst described by Grundmann and used in Example I. Carbon monoxide was introduced to a pressure of 1000 p. s. i. and the bomb was closed. It was rocked at a temperature of 175° C. for six hours. The maximum pressure developed was 1610 p. s. i. The bomb was cooled, carbon monoxide was released and the solution was filtered to remove catalyst. 157 ml. of cyclohexane was added and methanol was removed by distillation at atmospheric pressure. The residual cyclohexane solution on analysis showed 0.32 mole of nitrocyclohexane, 0.03 mole of cyclohexanone oxime and 0.03 mole of cyclohexanone. The conversion was thus 24% and the yield of oxime and cyclohexanone was each 30%. The mixture after removal of solvent was suitable for oximation to cyclohexanone oxime.

I claim:

1. A method for the production of cyclohexanone which comprises reacting nitrocyclohexane with carbon monoxide at a temperature of about 150 to 250° C. and a perssure of about 1000 to 2000 p. s. i. while the reaction mixture contains a hydrogenation catalyst.

2. A method according to claim 1 in which the hydrogenation catalyst is Raney nickel.

3. A method according to claim 1 in which the hydrogenation catalyst is Raney cobalt.

4. A method according to claim 1 in which the hydrogenation catalyst is palladium supported on carbon.

5. A method according to claim 1 in which the hydrogenation catalyst is silver-zinc-calcium catalyst.

6. A method according to claim 1 in which the hydrogenation catalyst is silicated zinc oxide catalyst.

References Cited in the file of this patent

UNITED STATES PATENTS

| | | |
|---|---|---|
| 1,845,280 | Jaeger | Feb. 16, 1932 |
| 2,423,180 | Doumani et al. | July 1, 1947 |